(12) United States Patent
Wheatley

(10) Patent No.: US 9,602,606 B2
(45) Date of Patent: Mar. 21, 2017

(54) SYSTEMS AND METHODS FOR A SOCIAL FACILITATOR SERVICE

(71) Applicant: United Video Properties, Inc., Santa Clara, CA (US)

(72) Inventor: David Wheatley, Tower Lakes, IL (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

(21) Appl. No.: 13/691,105

(22) Filed: Nov. 30, 2012

(65) Prior Publication Data

US 2014/0156746 A1  Jun. 5, 2014

(51) Int. Cl.
| | | |
|---|---|---|
| G06F 15/16 | (2006.01) | |
| H04L 29/08 | (2006.01) | |
| H04N 21/45 | (2011.01) | |
| H04N 21/4788 | (2011.01) | |
| H04N 21/482 | (2011.01) | |
| G06Q 50/00 | (2012.01) | |
| G06Q 30/02 | (2012.01) | |

(52) U.S. Cl.
CPC .......... H04L 67/22 (2013.01); G06Q 30/02 (2013.01); G06Q 50/01 (2013.01); H04L 67/18 (2013.01); H04L 67/306 (2013.01); H04N 21/4524 (2013.01); H04N 21/4788 (2013.01); H04N 21/4826 (2013.01)

(58) Field of Classification Search
USPC .......... 709/200–249; 705/14, 319; 707/999; 455/456
See application file for complete search history.

(56) References Cited

U.S. PATENT DOCUMENTS

| | | | | |
|---|---|---|---|---|
| 8,437,790 | B1* | 5/2013 | Hassan | H04W 72/044 370/329 |
| 8,467,955 | B2* | 6/2013 | Jiang et al. | 701/408 |
| 8,543,928 | B2* | 9/2013 | Stovicek | G06Q 10/10 379/201.12 |
| 8,554,873 | B1* | 10/2013 | Ganesh | 709/217 |
| 8,606,872 | B1* | 12/2013 | Reitnour et al. | 709/206 |
| 8,611,929 | B1* | 12/2013 | Vandehey et al. | 455/456.3 |
| 9,069,934 | B1* | 6/2015 | Meeboer | H04L 63/107 |
| 2011/0004501 | A1* | 1/2011 | Pradhan et al. | 705/8 |
| 2011/0090078 | A1* | 4/2011 | Kim | G06Q 10/109 340/522 |
| 2011/0211813 | A1* | 9/2011 | Marks | G06F 17/3089 386/297 |
| 2012/0046018 | A1* | 2/2012 | Bunting | 455/414.2 |
| 2012/0271883 | A1* | 10/2012 | Montoya et al. | 709/204 |
| 2013/0109407 | A1* | 5/2013 | Tipton | H04W 12/08 455/456.2 |
| 2014/0089320 | A1* | 3/2014 | Baldwin et al. | 707/748 |
| 2014/0129505 | A1* | 5/2014 | Lin et al. | 706/50 |

* cited by examiner

*Primary Examiner* — Joshua Joo
*Assistant Examiner* — Younes Naji
(74) *Attorney, Agent, or Firm* — Ropes & Gray LLP

(57) ABSTRACT

Systems and methods for providing social event recommendations to a user are provided. In particular, a user may be presented with recommendations for social events based on the user's interests, geographic location, or any other suitable constraints. A social event recommendation engine may additionally suggest friends, from the user's social network, that the user may wish to invite along to a recommended social event. The user may also be presented advertisements with the social event recommendations.

18 Claims, 8 Drawing Sheets

710 — <user profile data>
 720 — <user> John </user>
  <gender> Male </gender>
  <age> 32 </age>
  <interests> soccer, jazz, food </interests>
  <location> 1211 avenue of the americas, New York </location>
 </user profile data>

730 — <event data>
 740 — <event 1>
  742 — <title> Jazz, Concert </title>
  744 — <location> super arena, NY </location>
  746 — <characteristics> music, jazz, live </characteristics>
  </event 1>

750 — <event N>
  <title> Jets v. Giants </title>
  <location> meadowlands stadium, NJ </location>
  <characteristics> NFL, sports </characteristics>
  </event N>
 </event data>

FIG. 7

SYSTEMS AND METHODS FOR A SOCIAL FACILITATOR SERVICE

BACKGROUND

Mobile computing devices, such as smart-phones and tablet computers, have proliferated our lives. Most people now carry at least one such device on their person. Many of these devices are capable of determining their geographic location, enabling the development of location-aware applications such as FourSquare and Loopt. These applications encourage users to check in at various locations, such as businesses or events, corresponding to the users' geographic coordinates by offering coupons or virtual points. Location-aware applications can also be integrated with social network applications such as Facebook or Twitter to notify a user's friends of the user's check-ins. However, these applications fail to take into account any of the user's preferences or their relationships with their friends.

SUMMARY

In view of the foregoing, systems and methods for generating social event recommendations for a user are provided. A user may be presented with recommendations for social events based on the user's interests, geographic location, or any other suitable constraint. A social event recommendation engine may suggest friends from the user's social network whom the user may wish to invite to a recommended social event. The user may be shown advertisements along with the social event recommendations.

The user's profile may be created and stored in a user profile database as part of a social network. The user profile database may include information regarding the user's friends, such as their relationship to the user and their user profiles. The user profile database may store information regarding the geographic location of the members of the social network. Information regarding social events may be stored in a social events database. Information regarding upcoming social events may be collected from various online, local, or manual sources.

A social event recommendation engine may be implemented either locally on a user equipment device or remotely on a central server. The social event recommendation engine may utilize profile information stored in the user profile database and social event information stored in the social event database to generate social event recommendations for the user.

For example, the social event recommendation engine may query the user profile database to select one of the user's interests. The user profile database may be queried to determine whether the user has any friends who share a similar interest. A subset of the user's friends, each of whom has an interest listed in their user profile that matches the selected interest, may be selected. The social event recommendation engine may cross-reference the selected interest with characteristics of social events. For example, the social event recommendation engine may query the social event database to determine whether any stored social events are characterized by the selected interest. If a social event with a similar characteristic is found, that social event may be recommended to the user. The user may choose to invite the selected subset of friends to the recommended social event.

For example, the social event recommendation engine may query the user profile database to select one of the user's interests. The social event recommendation engine may cross-reference the selected interest with characteristics of social events. If a social event with a similar characteristic is found, that social event may be recommended to the user. The user profile database may be queried to determine whether the user has any friends who have an interest similar to a characteristic of the recommended social event. A subset of the user's friends, each of whom has an interest listed in their user profile that matches a characteristic of the recommended social event, may be selected. The user may choose to invite the selected subset of friends to the recommended social event.

Social event recommendations may be made based on the user's geographic location. For example, social event recommendation engine may determine the user's geographic location using geographic location determination circuitry of the user equipment device. The user's geographic location may also be determined from the user profile database. The user profile database may be queried to determine whether the user has any friends who are located nearby. The social event recommendation engine may query the social event database to determine whether any stored social events will occur near the user's geographic location. If a social event in a nearby geographic location is found, that social event may be recommended to the user.

Social event recommendations may be made based on other constraints such as the user's budget, the time availability of the user, or any suitable combination of such constraints. For example, the social event recommendation engine may recommend social events based on a combination of the user's interests, geographic location, and time availability. The user may customize the weight given to the different constraints.

The user may be presented with a recommendation for a social event in response to a user request to generate a social event recommendation. Alternatively, the user may be presented a social event recommendation automatically whenever a user is in the vicinity of a geographic location where a social event that may be of interest to the user is occurring.

The social event recommendation engine may display advertisements to the user in connection with social event recommendations. For example, if the social event recommendation engine recommends a music concert to the user, advertisements for video games with music similar to the music concert may be presented to the user. The social event recommendation engine may cache advertisements in local memory or may retrieve advertisements from an online server, as appropriate. In some embodiments, suitable advertisements may be stored together with social events in the social event database. In some embodiments, advertisements may be dynamically determined using a real-time bidding process. Advertisements may be based on the combined profiles of the user and the user's friends invited to the recommended social event.

The social event recommendation engine may send notifications to the user's friends upon receiving an input from the user. For example, social event invitations or reminders may be sent to friends selected by the user.

The social event recommendation engine may recommend support services alongside social event recommendations. For example, driving or public transportation directions to the venue of the social event may be presented to the user. This may make the user experience pleasant and seamless. Other support services may include restaurants, hotels, and gas stations.

In some embodiments, the social event recommendation engine may allow the user and the user's friends to collaboratively determine meeting plans. For example, the user and the user's friends may agree on a mutually convenient meeting location, car pooling arrangement, and rest stops. For example, the social event recommendation engine may determine groups of friends who are geographically co-located and may recommend that all friends in a group travel together. The social event recommendation engine may additionally provide transportation directions to all members of the group.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 7 shows illustrative data structures for user profiles and event data, in accordance with an embodiment of the invention;

DETAILED DESCRIPTION

Figure 1:
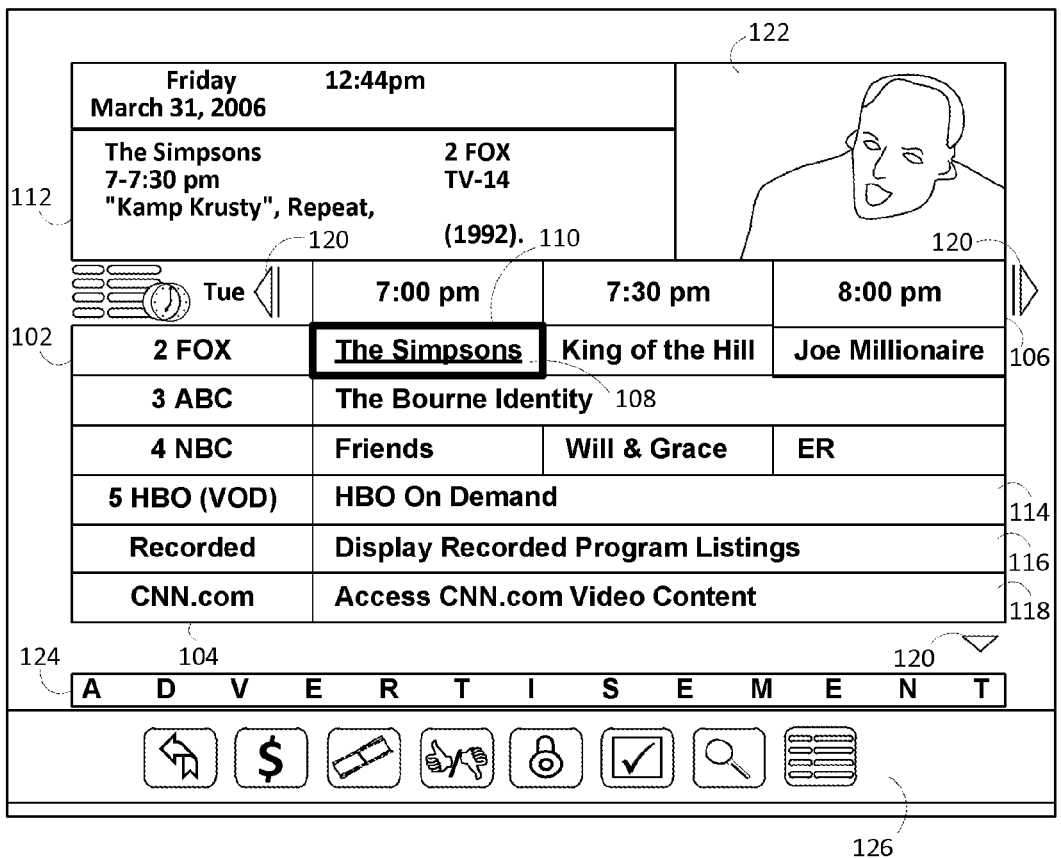
FIGS. 1 and 2 show illustrative display screens that may be used to provide media guidance application listings in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
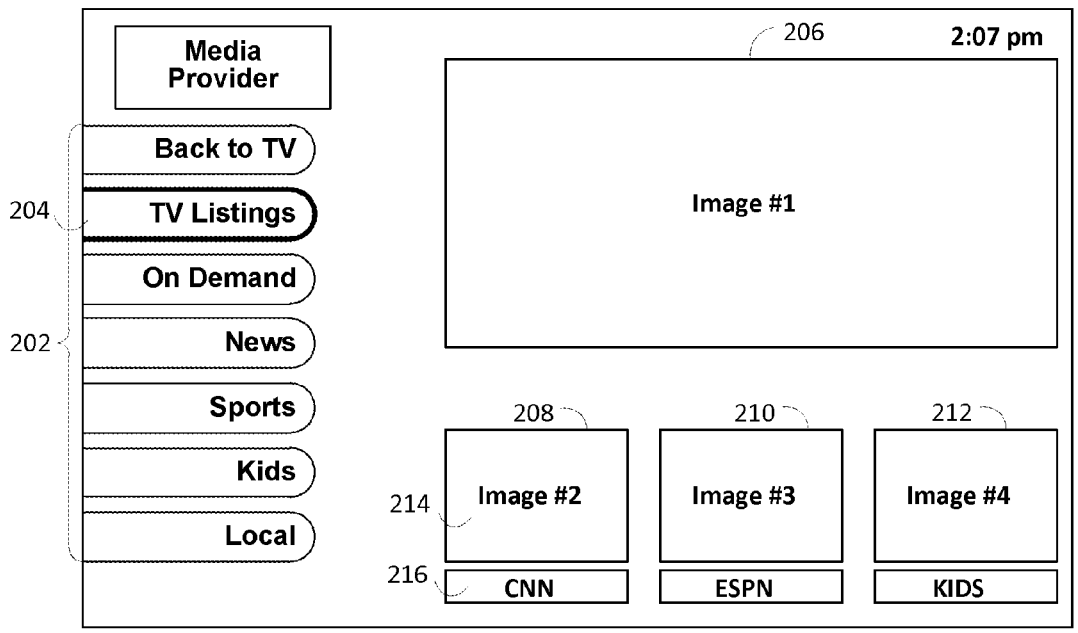

FIGS. 1-2 show illustrative display screens that may be used to provide media guidance data. The display screens shown in FIGS. 1-2, 5A, and 5B may be implemented on any suitable user equipment device or platform. While the displays of FIGS. 1-2, 5A, and 5B are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

Advertisement 124 may be related to social event recommendations. For example, as the user customizes a list of invitees to a recommended social event, the user may be presented with advertisement 124 for services or products preferred by the invitees. For example, as the user interacts with a map of a geographic location of a recommended social event, the user may be presented with advertisement 124 for services or products offered by businesses located in the geographic area displayed in the map. The user may alternatively and/or additionally also be presented with advertisement 124 for other social events with characteristics similar to those of the recommended social event. For example, if the recommended social event is a rock concert by The Killers, the user may be presented with advertisement 124 for upcoming rock concerts by artists such as Coldplay, Death Cab for Cutie, The Muse, etc.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. By monitoring the content the user accesses, the media guidance application may learn the user's interests and tastes. For example, if the user is a heavy viewer of football games the media guidance application may learn that the user is interested in sports. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Users may access content and the media guidance application (and its display screens described above and below) from one or more of their user equipment devices. The user may interact with the listings presented in display 200. In response to the user selection of media content shown in the listings, the media guidance application may present a temporal genre chart to the user. The temporal genre chart may show the amount in which various genre attributes are present in the selected media content over time.

Figure 3:
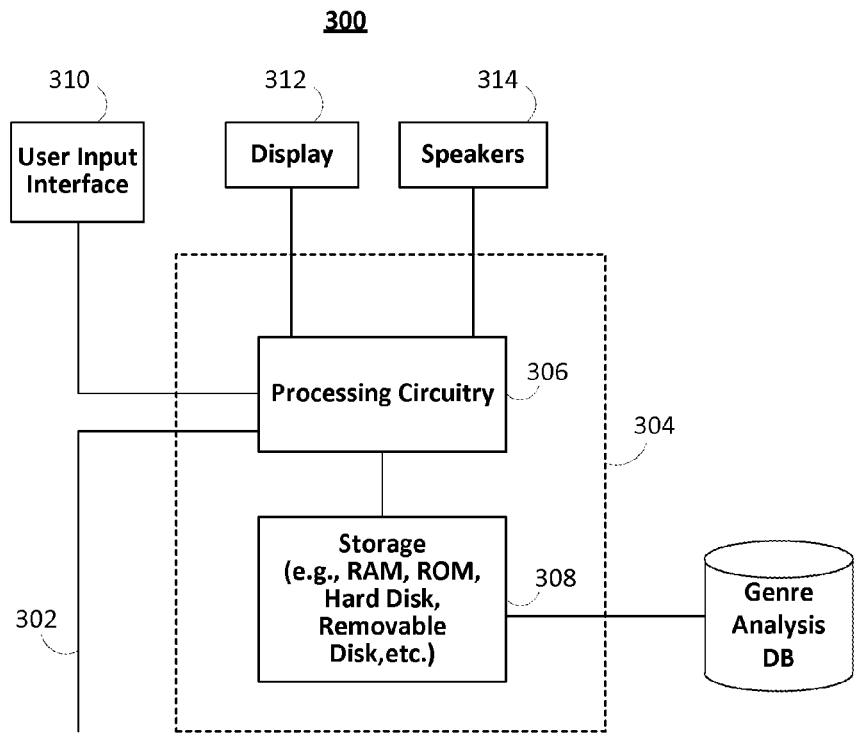
FIG. 3 shows an illustrative user equipment device in accordance with another embodiment of the invention.

FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

In some embodiments, control circuitry 304 may be configured to generate social event recommendations for the user. Accordingly, control circuitry 304 may include a social event recommendation engine for generating social event recommendations. Control circuitry 304 may include helper modules such as a notification engine and a geo-location engine, which are described in greater detail below in connection with FIG. 6.

User equipment 300 may include a user profile database and a social event database, for storing information regarding user profiles and social events, respectively. These databases, described in greater detail below in connection with FIG. 6, may alternatively be stored remotely on a server accessible over the Internet. The user profile database may be associated with a social network of which the user may be a member. The user profile database may record information related to the user's profile, friends, and connections. The user profile database may include fields identifying the user's identity, interests, friends, and geographic location.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. In some embodiments, user input interface 310 may be a remote control with pressure-sensitive buttons. Control circuitry 304 may recognize different amounts of pressure applied to the pressure-sensitive buttons and adjust navigation through, for example, the guidance application. For example, the amount of pressure applied may adjust the speed of scrolling through guidance application listings, such that when less pressure is applied, the listings scroll more slowly and when more pressure is applied, the listings scroll more quickly. The pressure-sensitive buttons may control any portion of the guidance application or a media device in any suitable manner. In some embodiments, user interface 310 may be a touch screen with a pressure-sensitive surface. Control circuitry 304 may recognize different amounts of pressure applied to the pressure-sensitive screen and adjust navigation accordingly.

Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

In some embodiments, user input interface 310 may be incorporated into a mobile device, such as a mobile phone. In such embodiments, user input interface 310 may obtain appropriate commands, information, and/or updates associated with a user or media device, or any other suitable information via the cellular phone network. In some embodiments, user input interface 310 may communicate with an intermediate device that may convert any suitable communication means to any other suitable communication means. For example, a user may attempt to scroll through a guidance application using the user's mobile phone incorporated with user input interface 310. User input interface 310 may output wireless packets to communicate with user's scroll instructions. An intermediate device may receive the wireless packets and in turn transmit infrared packets to control circuitry 304.

Control circuitry 304 may include processing circuitry capable of interpreting gestures or motion detected by sensors on-board user equipment device 300. Control circuitry 304 may include an accelerometer, a gyroscope, a magnetometer, or other similar circuitry capable of sensing and interpreting movements of user equipment device 300. Control circuitry 304 may also include a proximity sensor capable of detecting when other devices corresponding to friends of the users, according to a social network, are in the vicinity of user equipment device 300. Thus, control circuitry 304 may determine when the user's friends are geographically located nearby.

Control circuitry 304 may include any suitable hardware and/or software to perform detection and identification operations related to the user's geographic location. For example, control circuitry 304 may include infrared, optical, and/or radio-frequency receivers and/or transmitters to receive geographic location information from other user devices. Control circuitry 304 may additionally, or alternatively, include one or more microphone and/or camera to detect audible and/or visual information, respectively.

For example, control circuitry 304 may use received signal strength indication (RSSI) from a cellular tower to determine the distance the user is from another cellular tower. For example, RSSI values may be triangulated to determine the location of the user's device. Control circuitry 304 may also use, for example, triangulation and/or time difference of arrival determination of appropriate information to determine the location of the user's device. For example, time difference of arrival values of sounds emanating from another user device may be determined.

In some embodiments, any suitable image processing, video processing, and/or computer vision technique may be used to determine a user's distance, trajectory, and/or location in relation to a cellular tower or wireless base station. A user's distance, trajectory, and/or location in relation to a cellular tower or wireless base station whose geographic location is known may be determined using any suitable method. For example, control circuitry 304 may detect and identify cellular towers or wireless base stations by using these techniques when cellular towers or wireless base stations are within a measurable distance from the user's device.

The measurable distance may be limited by ability of the detecting circuitry to resolve or measure features. For example, the measurable distance from which a camera may resolve two spaced points may be limited based on optical resolution of the camera. For example, the measurable distance from which a wireless antenna may be able to detect a received signal above background noise may depend on the initial intensity of the transmitted signal and an absorption coefficient of the surround transmission medium.

In some embodiments, control circuitry 304 may determine a location based on global positioning system (GPS) measurements, or in the case of cellular telephones, measurements based on cell-tower signals.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
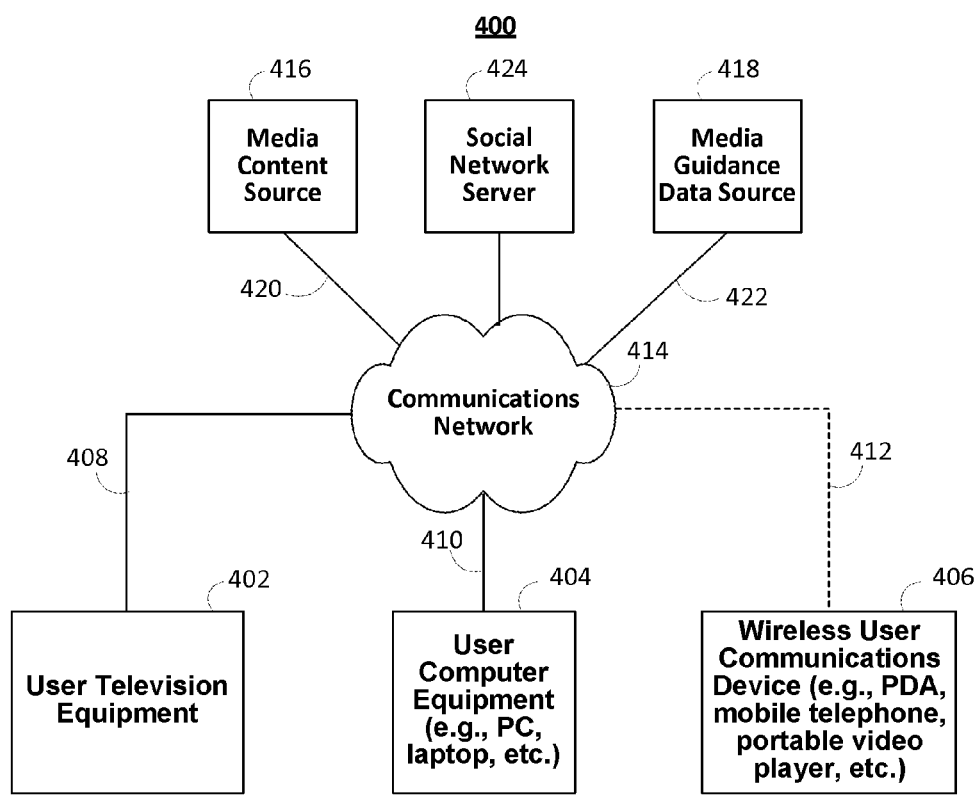
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. For example, a temporal genre chart corresponding to a media content selected on the first screen may be presented on the second screen. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416, media guidance data source 418, and social network service server 424 coupled to communications network 414 via communication paths 420 and 422, respectively. Paths 420 and 422 may include any of the communication paths described above in connection with paths 408, 410, and 412. Communications with the content source 416, media guidance data source 418, and social network service server 424 may be exchanged over one or more communications paths, but are shown as a single path in FIG. 4 to avoid overcomplicating the drawing. In addition, there may be more than one of each of content source 416, media guidance data source 418, and social network service server 424, but only one of each is shown in FIG. 4 to avoid overcomplicating the drawing. (The different types of each of these sources are discussed below.) If desired, content source 416 and media guidance data source 418 may be integrated as one source device. Although communications between sources 416, 418, and 420 with user equipment devices 402, 404, and 406 are shown as through communications network 414, in some embodiments, sources 416, 418, and 420 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data source 418 may also be capable of generating temporal genre charts offline and providing relevant data to user equipment device 300 upon user request.

Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Social network service server 424 may store the user's social network profile. The user's social network profile may include the user's preferences, interests, and social relationships. For example, social network service server 424 may include information regarding the user's social network friends. The user's social relationships may be further specified in terms of the quality of the relationship such as an acquaintance, close friend, or family member. Social network service server 424 may be located remotely.

Content, media guidance data, and/or social network service data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more rein recommending the selected social event further rises sending at least one of an email, text message, phone call, social networking website notification, equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

For illustrative purposes, the present invention is described in the context of an interactive media guide that provides a user recommendations for social events. For example, a user may be presented with information regarding one or more social events based on the user's interests and/or geographic location.

A social event may be any event where more than one person is potentially present. For example, movies, plays, shows, concerts, restaurant outings, wine tastings, sports events, cooking classes, television programs, community events, music festivals, children's activity events, friends hanging out, or parties may all be social events. For example, a user may be a Diana Krall fan. The interactive media guide may look through the user's friends on one or more social networks to determine whether any of the user's friends are also Diana Krall fans. Friends who are located in an area geographically close to the user may further be identified. The media guidance application may then send notification to the user and the user's friends in connection with an upcoming Diana Krall concert.

In an embodiment, social events may be recommended to the user based on the user's interests. The user's friends who have interests similar to the user's interests may be determined. In particular, interests of the user's friends may match the interests of the user. The social events recommended to the user may also be recommended to the user's friends who have interests similar to the user. This is described in greater detail in connection with FIGS. 6-9 below.

In an embodiment, the user's friends who have interests similar to the characteristics of a social event recommended to the user may be determined. In particular, interests of the user's friends may match the characteristics of a recommended social event. The social event recommended to the user may then also be recommended to the user's friends with interests similar to the characteristics of the recommended social event. This is described in greater detail in connection with FIG. 9 below.

Any embodiments described above and below may be combined in any suitable manner. For example, a social event may be recommended to the user based on the user's interests. The user's friends who have interests similar to the user's interests may be determined. The user's friends who have interests similar to the characteristics of the social event recommended to the user may additionally be determined. The social event may be recommended to both sets of the user's friends.

In an embodiment, a subset of the user's friends to whom the social event is recommended may also be presented with information regarding support services such as transportation, accommodation, and food. For example, the social event recommendation engine may determine groups of friends, whom the user wishes to invite to the social event, that are geographically co-located and may recommend that all friends in a group travel together. The social event recommendation engine may provide transportation directions to all members of the group and to the user. This is described in greater detail in connection with FIG. 5 and the description following FIG. 10 below.

Figure 5B:
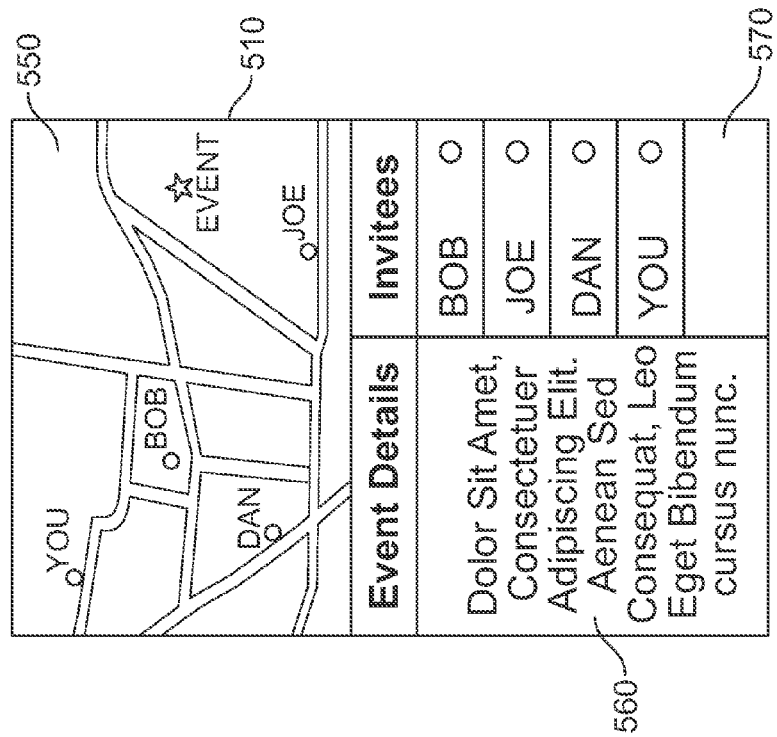
FIGS. 5A and 5B show illustrative display screens presenting the user with an opportunity to obtain a social event recommendation, in accordance with an embodiment of the invention.
Figure 5A:
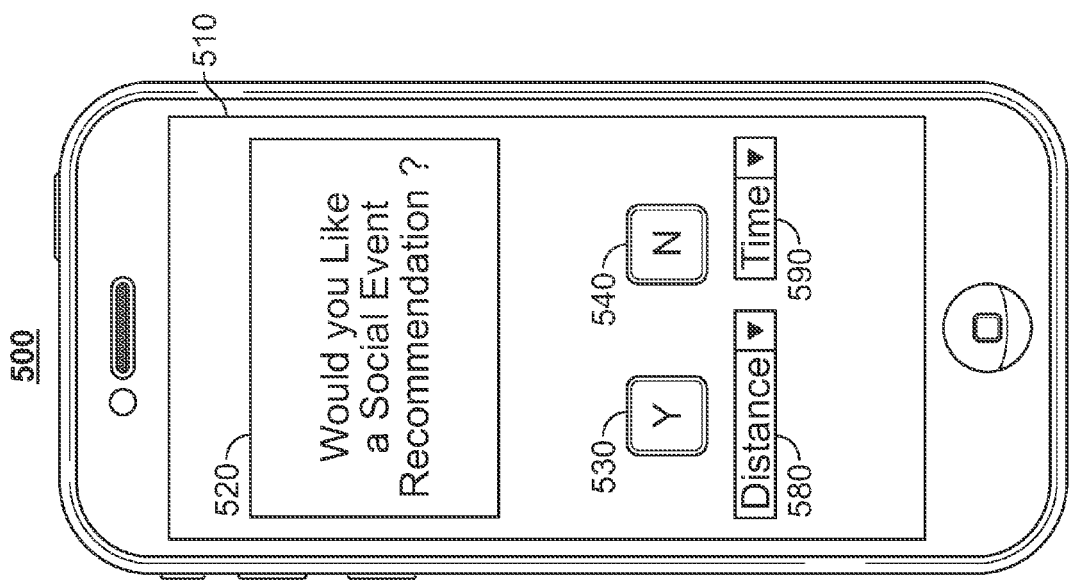

FIGS. 5A and 5B show illustrative display screens presenting the user with an opportunity to obtain a social event recommendation, in accordance with an embodiment of the invention. FIG. 5A shows device 500 with display screen 510. Display screen 510 may include notification box 520, buttons 530 and 540, and settings for distance 580 and time 590.

Device 500 may be user television equipment 402, user computer device 404, wireless user communications device 406, or any other suitable device. Display screen 510 of device 500 may display notification box 520 to the user. Notification box 520 may be a pop-up window or an overlay and may include any suitable combination of graphics or text. Notification box 520 may request user input to determine whether the user would like to receive a recommendation for a social event. The user may utilize buttons 530 and 540 to accept or decline social event recommendations.

Notification box 520 may be displayed to the user automatically. For example, notification box 520 may be displayed if the user is in the vicinity of any event that may be of interest to the user. The strength of the user's interest in the event may be determined based on the user's profile. Methods for determining the location of the user with respect to the location of events is discussed further in connection with FIG. 6 below. For example, notification box 520 may be displayed if the user is in the vicinity of one or more of his friends. Notification box 520 may also be displayed in response to a user request to receive social event recommendations.

The user may setup categories of social events for which the user is interested in receiving notifications. For example, the user may only be interested in social events related to whiskey tasting during a particular week. Accordingly, the user may set an option indicating categories of social events that the user is interested in. In the above example, the user may set the option to indicate an interest in whiskey. The user may also set a time duration for which the setting will remain valid. In the above example, the user may set the time duration to be one week.

The user may additionally customize the social events that are recommended based on settings such as distance and time. For example, the user may utilize distance setting 580 to customize how far the geographic location of a recommended social event may be from the user's geographic location. Distance setting 580 may be a pull-down menu or any other appropriately interactive setting that allows a user to specify a distance threshold. For example, the user may only be interested in social events occurring less than 25 miles away from the user's geographic location. If a user does not specify a distance threshold then any suitable default value for the distance threshold may be used. Accordingly, only those social events may be recommended to the user occurring at a geographic location less than the distance threshold away from the geographic location of the user.

For example, the user may utilize time setting 590 to customize a time interval within which the user is available to attend a social event. Time setting 590 may be a pull-down menu or any other appropriately interactive setting that allows a user to specify a time interval. For example, the user may only be interested in social events occurring after 8:00 pm on weeknights. If a user does not specify a time interval then any suitable default value for the time interval may be used. Accordingly, only those social events may be recommended to the user occurring during a time interval specified by the user.

For example, the user may only be interested in social events that begin in two or more hours from the current time. The user may customize this time value according to his or her preferences. This may allow the user sufficient time to travel to the geographic location of the social event. For example, if the social event begins in one hour, the user may not be notified of the social event because there may not be sufficient time for the user to travel to the geographic location of the social event. The determination of how much time the user will need to travel to the geographic location of the social event may be made automatically based on the user's current geographic location and the current traffic conditions.

FIG. 5B shows a display screen indicative of the manner in which a recommendation for a social event may be presented. Display screen 510 may present the social event recommendation to the user in the format shown in FIG. 5B including map region 550, event details region 560, and invitees region 570. Map region 550, event details region 560, and invitees region 570 may be positioned in any reasonable manner on display screen 510.

Display screen 510 may be displayed on device 500 in response to receiving a user input requesting a social event recommendation. For example, the user may press, click, touch, or use any other suitable method of interacting with button 530 of FIG. 5A to indicate that the user would like to receive a social event recommendation.

A social event recommendation may include three components—information regarding the invitees, the social event, and the geographic locations of the user, the user's friends, and the social event. Invitees region 570 may include information regarding the persons invited to the recommended social event. For example, invitees region 570 may suggest the names of some of the user's friends whom the user may wish to invite to the recommended social event. The user may choose some or all of the suggested friends to invite to the social event. The user may also be provided with an option to add additional friends to invite to the social event. After the user sends out the invitation to the social event, invitees region 570 may be updated to provide an indication next to the names of each of the invitees of whether that invitee has chosen to accept, decline, or tentatively accept the invitation.

In some implementations, the user and the user's friends may all receive notifications regarding the recommended social event. For example, the interactive media guide may look through the user's friends on one or more social networks to determine whether any of the user's friends have interests similar to the user's interests. Friends who are located in an area geographically close to the user may further be identified. The media guidance application may then send a notification to the user and the user's friends in connection with an upcoming event related to the common interest. The user and the user's friends may be notified of the event simultaneously. The user and the user's friends may subsequently collaborate to firm up plans to attend the recommended social event.

Event details region 560 may include information regarding the details of the recommended social event. For example, event details region 560 may provide a name, time, geographic location, and a description of the recommended social event. For example, if the recommended social event is a rock concert where the Killers are performing, event details region 560 may include information indicating the cost of the event, that the social event is a Killers concert, taking place at the Meadowlands Stadium, New Jersey, on Nov. 23, 2012 at 8:00 pm.

The cost of the social event displayed in event details region 560 may be the cost of the entrance to the social event. The cost of entrance to a social event may indicate the price of a ticket to the social event. The price of a ticket to the social event may be determined by automatically checking an online event listing or database. The cost of the social event may include transportation costs in some embodiments. For example, transportation costs such as the bus fare, car rental, cost of gas, or hotel accommodation may be included in the cost of the social event.

In some implementations, the recommended social event may be a social gathering of people with similar interests. For example, if the recommended social event is a meeting of friends interested in chess, event details region 560 may include information indicating that the social event is a chess gathering, taking place at the user's home, on Nov. 23, 2012 at 6:00 pm.

Map region 550 may include information regarding the geographic locations of the user, the user's friends, and the recommended social event. For example, map region 550 may display a map on which the geographic locations of the user, friends of the user who happen to be nearby, and the social event. For instance, continuing the example of the Killers concert described above in connection with FIG. 5B, if the user is in Secaucus, N.J. then map region 550 may indicate the geographic location of the user in Secaucus, N.J., and the geographic location of Meadowlands Stadium, New Jersey. Map region 550 may also indicate the geographic locations of the user's friends who happen to be in the area. Indications of the geographic locations of a user's friend may give the user an indication of the likelihood that that friend might attend the recommended social event. For example, if the user's friend, Bob, is really close to Meadowlands Stadium, then Bob might be more likely to attend the social event than if Bob was far away from the social event. The user may accordingly choose to preferentially invite friends who are closer to the geographic location of the social event than friends who are far away.

Map region 550 may obtain its data regarding the geographic locations of the user and the user's friends from a social network application such as Foursquare or Facebook to which users indicate their geographic location at will or periodically. Map region 550 may indicate the geographic locations of the user and the user's friends on an overlay and/or transparent layer. Any other suitable combination of text and graphics may also be used.

In some implementations, the user may additionally be presented with information regarding support services such as transportation, restaurants, hotels, or other products. For example, map region 550 may include an option selectable by the user that reveals information regarding support services. The user may additionally choose to view information regarding a single service at a time. For example, in response to selection by the user of an option to display transportation services information, map region 550 may present the user with directions on how to get to the geographic location of the social event. Map region 550 may include options allowing the user to view public or private transportation options. For example, public transportation options may indicate bus, train, and/or subway information. Private transportation options may indicate driving directions and travel time information. Map region 550 may include options allowing the user to obtain transportation directions to any of the geographic locations of the user's friends indicated on map region 550.

Transportation services information presented to the user may be customized according to the user's preferences. For example, the user may prefer taking public transportation. Accordingly, only public transportation services may be displayed to the user. If the user prefers carpooling, carpool transportation options may be presented first to the user.

Transportation services information may be sorted according to parameters such as cost, travel time, preferred carrier, number of transfers, and/or synergy with friends' travel plans. For example, the user may be presented with the cheapest transportation services first. Cheap transportation may include public transportation options such as mass transit. In some instances, the user may prefer seeing the fastest transportation options. Accordingly, the user may be presented with the fastest transportation services first. Fast transportation may include driving directions. The user may also be presented with a list of gas stations and/or food stops along the driving route for added convenience.

The user may prefer particular transportation carriers. For example, the user may always desire to use a particular limousine service, bus service, or air carrier. Accordingly, the transportation services information presented to the user may be tailored according to the preferred transportation carriers. The transportation services information displayed to the user may also minimize the number of travel stops. For example, if the user prefers public transportation, the transportation services information presented to the user may be designed to minimize the number of transfers that the user is required to take. For example, the user may be presented with the longer bus route instead of being required to transfer to a rail service.

The user may prefer travelling with friends. Accordingly, the transportation services information presented to the user may be designed to allow the user to sync transportation with his or her friends. For example, public transportation options presented may include common meeting points where the user may conveniently add one or more friends to the travelling party. For example, driving directions may include carpooling suggestions.

The user and the user's friends may collaboratively determine travel plans. For example, the user and the user's friends may agree on a mutually convenient meeting location, car pooling arrangement, and rest stops. For example, groups of friends who are geographically co-located may be determined and all friends in a group may travel together. Transportation directions to all members of the group may be provided.

In response to selection by the user of an option to display accommodation services information, map region 550 may present the user with a list of accommodations located within a user specified distance, either from the geographic location of the user or the geographic location of the social event. Accommodation information may also be presented within a user specified distance from the geographic location of any of the user's friends indicated on map region 550.

Similarly, in response to selection by the user of an option to display restaurant services information, map region 550 may present the user with a list of restaurants located within a user specified distance, either from the geographic location of the user or the geographic location of the social event. Restaurant information may also be presented within a user specified distance from the geographic location of any of the user's friends indicated on map region 550.

When a user chooses to purchase any accommodation or support services products displayed in map region 550, some percentage of the sale price may be delivered to the social event recommendation system as commission. In some implementations, support services products such as hotels, rental cars, restaurants, souvenirs, etc. may be presented to the user on display screen 510 simultaneously with details of the social event as described above. The social event recommendation system may also gain a percentage of any ad revenue generated by the user's interaction with the presented advertisements. Advertisements may be substantially similar to advertisement 124 described in connection with FIG. 1 above. In some embodiments, advertisements may be dynamically determined using a real-time bidding process. For example, entities that are interested in advertising their products or services alongside a recommended social event may participate in real-time bidding. The advertisement of the entity with the winning bid may be displayed with the recommended social event.

The user may be presented with advertisements upon interaction with any interactive elements of display screen 510. Advertisements may be based on the combined profiles of the user and the user's friends invited to the recommended social event. For example, as the user customizes the list of invitees on invitee region 530 by interacting with an icon representing Bob, the user may be presented with advertisements for services or products preferred by Bob. For example, as the user interacts with map region 550, the user may be presented with advertisements for services or products offered by businesses located in the geographic area displayed in map region 550. The user may alternatively and/or additionally also be presented with advertisements for other social events with characteristics similar to those of the recommended social event. For example, if the recommended social event is a rock concert by The Killers, the user may be presented with advertisements for upcoming rock concerts by artists such as Coldplay, Death Cab for Cutie, The Muse, etc.

In some implementations, map region 550 may allow the user to collaborate with one or more of his or her friends on support services information. For example, the user may coordinate getting to the geographic location of the social event with his friend, Bob. The user and Bob may collaboratively determine a convenient meeting point and commute to the geographic location of the event together. In some implementations, based on the user's preferences, the social event recommendation system may determine the optimal transportation directions, accommodations if required, and restaurant recommendations. Transportation directions, accommodation suggestions, and restaurant recommendations may be determined based on the user's profile. For example, if the user's profile indicates that the user prefers to use public transport, then only public transportation directions may be determined and presented to the user.

The social event recommendation system may purchase tickets or make reservations, as appropriate, for the social event for the confirmed attendees to the social event. For example, if the recommended social event is the Killers concert, the social event recommendation system may purchase concert tickets for the user and the user's friends who have indicated that they plan to attend the concert. For example, if the recommended social event is a game of chess, then the social event recommendation system may make reservations at a café or any other suitable location, after approval from the user or his or her friends, so that they have a gathering place.

The user and the user's friends may subsequently receive information regarding the organization of the social event. For example, all persons who have indicated that they plan to attend the social event may receive information regarding the purchase of tickets to the social event and instructions on how to get to the social event, where to stay and where to eat. For example, all persons who plan to attend the event may receive an email, text message, online notification, social network notification, or any other suitable notification including the relevant information described above.

In some implementations, the social event recommendation system may post status updates to the profiles of the user and the user's friends who plan to attend the recommended social event. Status updates may be posted only if the user or the user's friend has authorized the social event recommendation system to post status updates on their behalf. In some implementations, the social event recommendation system may send reminders regarding an upcoming social event to the user and the user's friends who plan to attend the social event.

Figure 6:
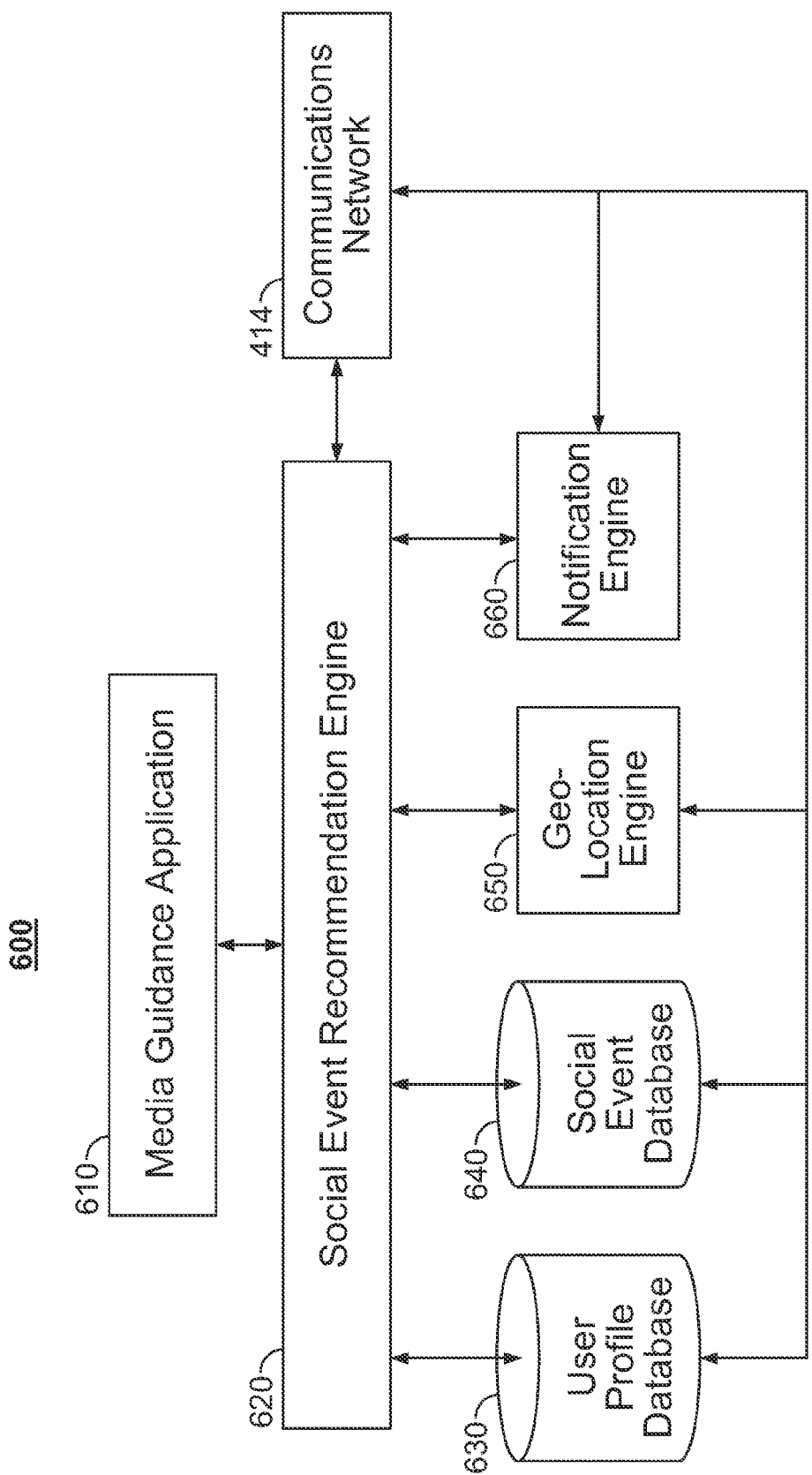
FIG. 6 shows an illustrative block diagram of a system used to generate a social event recommendation, in accordance with an embodiment of the invention.

FIG. 6 shows an illustrative block diagram of a system used to generate a social event recommendation, in accordance with an embodiment of the invention. System 600 includes media guidance application 610, social event recommendation engine 620, user profile database 630, social event database 640, geolocation engine 650, notification engine 660, and communications network 414. Some or all of these components may be part of control circuitry 304. In some implementations, user profile database 630 and social event database 640 may reside at social network service server 424 of FIG. 4.

Social event recommendation engine 620 may be coupled via communication lines to media guidance application 610, user profile database 630, social event database 640, geolocation engine 650, notification engine 660, and communications network 414. User profile database 630 and social event database 640 may be substantially similar to storage 308, and may be internal or external.

Media guidance application 610 may be substantially similar to the interactive media guidance application discussed above in connection with FIGS. 1 and 2. In some implementations, media guidance application 610 may control the operation for social event recommendation engine 620. For example, the front-end interface which the user interacts with may be media guidance application 610, i.e., the user may request media guidance application 610 to provide social event recommendations. In some implementations, media guidance application 610 may simply provide the user access to social event recommendation engine 620.

User profile database 630, social event database 640, geolocation engine 650, and notification engine 660 may be either internal or external to control circuitry 304. For example, if user profile database 630, social event database 640, geolocation engine 650, and notification engine 660 are external to control circuitry 304 then user profile database 630, social event database 640, geolocation engine 650, and notification engine 660 may communicate with social event recommendation engine 620 via communications network 414. In some implementations, user profile database 630 and social event database 640 may be locally cached copies of a profile and event database stored externally.

User profile database 630 may store user profile data for the user and the friends of the user. For example, if the user belongs to a social network, user profiles corresponding to members of the social network may be stored in user profile database 630. User profiles may be generated in a manner substantially similar to that described above in connection with FIG. 1. The structure of user profile database 630 is described further in connection with FIG. 7 below.

User profile database 630 may be indexed according to users' interests so that the determination of users with similar interests is easier. User profile database 630 may interact with geolocation engine 650. For example, a user's geographic location determined by geolocation engine 650 may be stored in user profile database 630. In some implementations, user profile database 630 may interact with geolocation engine 650 via social event recommendation engine 620.

Social event database 640 may store information regarding social events. The structure of social event database 640 is described further in connection with FIG. 7 below. Social event database 640 may be populated with social event information retrieved from a variety of sources. For example, social event database 640 may be populated with data from online event sources such as TicketMaster. For example, social event database 640 may be populated with data from a web crawler that culls relevant information from Internet webpages. Users may also manually input information regarding social events or create social events in social event database 640.

Geolocation engine 650 may be operable to determine the geographic location of a user. For example, if user equipment device 300 is a mobile device, geolocation engine 650 may reside on the mobile device and determine its current geographic location. The geographic location of the mobile device may be interpreted to be the geographic location of the user. Geolocation engine 650 may determine the geographic location of the mobile device using any suitable technique. For example, geolocation engine 650 may use GPS technology or triangulation techniques using wifi or cellular towers. In some implementations, the user may choose to manually enter his or her geographic location to protect privacy.

The user may elect to set up a default geographic location, such as the user's home or office, as the user's geographic location. The user may setup a preference to use their static home address as the geographic location reference for some events and their dynamic geographic location determined by geolocation engine 650 for other events. Any suitable combination of static or dynamic geographic locations may also be used. For example, the dynamic geographic location determined by geolocation engine 650 may be used for receiving recommendations for social events in the immediate future. When the user is out and about and is seeking recommendations for social events occurring in the next two hours, his dynamic geographic location determined by geolocation engine 650 may be used. For example, the user's static home address may be used for receiving recommendations for social events in the longer term future. When the user is seeking recommendations for social events occurring sometime within the next month, the user's static home address may be used.

Notification engine 660 may be operable to send notifications to a user and/or friends of the user who plan to attend a recommended social event. For example, notification engine 660 may send all people who have indicated their interest in attending the recommended social event with a notification including all relevant details of the social event. Notification engine 660 may send the people an email, text message, social network notification, web notification, phone call, or any other suitable notification. Notification engine 660 may utilize communications network 414 for sending out notifications.

Social event recommendation engine 620 may be a hardware or software agent responsible for generating social event recommendations for presentation to the user. For example, social event recommendation engine 620 may receive a user request, via media guidance application 610 for generating a social event recommendation. Social event recommendation engine 620 may subsequently recommend a social event by performing the following steps.

Social event recommendation engine 620 may query user profile database 630 to determine the user's interests. For example, social event recommendation engine 620 may read the tags characterizing the user's interests from an interest field in the user's profile. The interest field is described in greater detail below in connection with FIG. 7.

Social event recommendation engine 620 may query social event database 640 to determine any social events with at least one characteristic that is similar to the user's interests. For example, if the user is interested in listening to jazz, social event recommendation engine 620 may query social event database 640 for all jazz related social events. Such social events may include music concerts, book readings, historical tours, educational lectures, jazz lessons, movies, television programs, or radio shows.

Social event recommendation engine 620 may query social event database 640 to determine any social events that are scheduled to occur in a geographic location close to the user's geographic location. For example, if the user is currently in SoHo, Manhattan, N.Y., social event recommendation engine 620 may query social event database 640 for all social events taking place in that geographic location.

In some implementations, social event recommendation engine 620 may query social event database 640 for all social events taking place at geographic locations that are within a threshold distance of the geographic location of the user. The threshold may be a user specified parameter or may be automatically determined based on the user's preferences. Distances between the geographic location of a social event and the geographic location of the user may be determined using Euclidean distance calculations, vector distance calculations, or any other suitable measures.

In some implementations, social event recommendation engine 620 may query social event database 640 to determine any social events that satisfy the following constraints—(1) the social events are scheduled to occur in a geographic location close to the user's geographic location, (2) the social events are scheduled to occur within a certain time interval, and (3) the social events have at least one characteristic that is similar to the user's interests.

Social event recommendation engine 620 may query social event database 640 to determine social events based on parameters other than the user's interests or geographic location. For example, social events may be determined based on the user's budget or time availability. For example, the user may be interested only in social events that are free or cost less than $20 per head. Additionally and/or alternatively, the user may be interested in social events that begin only after 5:00 pm on weekdays or that occur on weekends. In some instances, the user may be interested in events that last less than two hours. Such timing preferences for social events may be pre-determined or customizable by the user. Social event recommendation engine 620 may filter social events stored in social event database 640 using any of the above or other suitable parameters.

As described in greater detail below in connection with FIG. 7, each social event stored in social event database 640 may be associated with characteristics that characterize that social event. For example, a concert by Diana Krall in New York may have the following characteristics associated with it: music, jazz, live event, and/or New York. When social event recommendation engine 620 queries social event database 640 for generating social event recommendations, social event recommendation engine 620 may match characteristics of the social events stored in social event database 640 with the interests or the geographic location of the user. Social event recommendation engine 620 may also match characteristics of the social events stored in social event database 640 with other parameters such as the user's budget or time availability.

Social event recommendation engine 620 may use any suitable matching algorithm such as comparing word strings corresponding to the social event characteristic to word strings corresponding to the user's interests. Pattern matching algorithms that identify similarities in word strings or phrases may also be employed. Social event recommendation engine 620 may map both the characteristics of social events and the interests of the user to points in a multidimensional space and then determine the magnitude of the vector distance between the respective points. A small magnitude of the vector distance may indicate a high similarity between the characteristics of social events and the interests of the user.

Social event recommendation engine 620 may query user profile database 630 to determine if the user is friends with any people who have at least one interest that is similar to the user's interests. For example, social event recommendation engine 620 may identify Bob, Dan, and Joe from the user's list of friends because they all enjoy listening to jazz music like the user.

Social event recommendation engine 620 may cross-reference the interests of the user's friends with the characteristics of a social event that has characteristics similar to the user's interests. For example, if the user is interested in a first sporting event team (e.g., a football team, say the New York Giants), social event recommendation engine 620 may identify a football game between the New York Giants and a second sporting event team (e.g., a football team, say the Miami Dolphins), as being of interest to the user. Accordingly, social event recommendation engine 620 may determine whether any of the user's friends are interested in football, the first sporting event team, or the second sporting event team. In this manner, social event recommendation engine 620 may identify some or all of the user's friends whose interests are similar to the characteristics of a social event with characteristics similar to the user's interests.

If social event recommendation engine 620 does not find any social events that match a first interest of the user, then social event recommendation engine 620 may attempt to find social events that match a second interest of the user. In the event that social event recommendation engine 620 does not find any social events in social event database 640 that match the user's interests stored in user profile database 630, social event recommendation engine 620 may request the user to input another interest. In the event that social event recommendation engine 620 does not find any social events in social event database 640 that match the user's interests stored in user profile database 630, social event recommendation engine 620 may present some or all available social events to the user to determine whether the user is interested in any of them.

In the event that social event recommendation engine 620 does not find any social events in social event database 640 that match the user's interests, geographic location, or other parameters, social event recommendation engine may suggest that the user meet up with some of his or her friends with similar interests who happen to be geographically located nearby. For example, if Bob, Dan, and Joe are determined to be close to the user's location, social event recommendation engine 620 may recommend that the user meet them to discuss jazz related activity.

Once social event recommendation engine 620 presents a social event to the user, social event recommendation engine 620 may allow the user to customize the people the user wishes to invite to the social event. Upon receiving an input from the user to send event invitations to a customized list of the user's friends, social event recommendation engine 620 may send notifications to the selected friends via notification engine 650.

Social event recommendation engine 620 may also determine relevant advertisements or promotions to display to the user in conjunction with a recommended social event. For example, social event recommendation engine 620 may display advertisements for new cars when presenting the user with driving directions to the recommended social event.

FIG. 7 shows illustrative data structures for user profiles and event data, in accordance with an embodiment of the invention. A first data structure may include a user profile information section containing user profile data 710. A second data structure may include social event data 730.

User profile data 710 is used to identify the user. User profile data 710 may include descriptive information 720 about a user such as user ID number, name, gender, age, interests, geographic location, and friends. The user ID number may be a unique number assigned to identify a user. Examples of such ID numbers may include national identity card numbers, social security numbers, passport numbers, or a hash code generated from the full name and birth date of the user.

The interests field of descriptive information 720 of the user profile data 710 may specify interests of the user. For example, the user may be interested in soccer, jazz, and food. Accordingly, the interests field may be populated with tags corresponding to these interests. Interests of the user may be learned over time and/or may be inputted by the user. In some implementations, tags that are broader in scope than narrow interests of the user may also be entered in the interests field. For example, if the user is crazy about cake, then the tag labeled food may be entered in the interests field.

The geographic location field of descriptive information 720 of user profile data 710 may specify a default or a current geographic location of the user. For example, if the user's residential address is 1211 Avenue of the Americas, New York 10036, this geographic location may be stored as the user's default geographic location. Alternatively, the geographic location may be updated with a geographic location corresponding to the user's current whereabouts.

The friends field of descriptive information 720 of user profile data 710 may specify the user's friends in the context of a social network. For example, the friends field may identify each of the user's friends by name or by any other suitable identity identifier. The friends field may have subfields for categorizing the user's friends by their degree of friendship with the user. For example, the user may know some people as mere acquaintances but may be best friends with others.

Social event data 730 may include information regarding multiple social events such as social event 1 740 to social event N 750. Social event 1 740 may include the fields title 742, geographic location 744, and characteristics 746. Social event N 750 may include similar fields.

Title 742 may include information regarding the title of social event 1 740. For example, if social event 1 is a jazz concert, title 742 may specify that it is a Diana Krall jazz concert. Geographic location field 744 may include information regarding the geographic location of social event 1 740. For example, geographic location field 744 may specify that Diana Krall will be performing at Super Arena, New York. Characteristic field 746 may include information that characterizes the social event. For example, a concert by Diana Krall in New York may have the following characteristics associated with it: music, jazz, live event, and/or New York.

Figure 8:
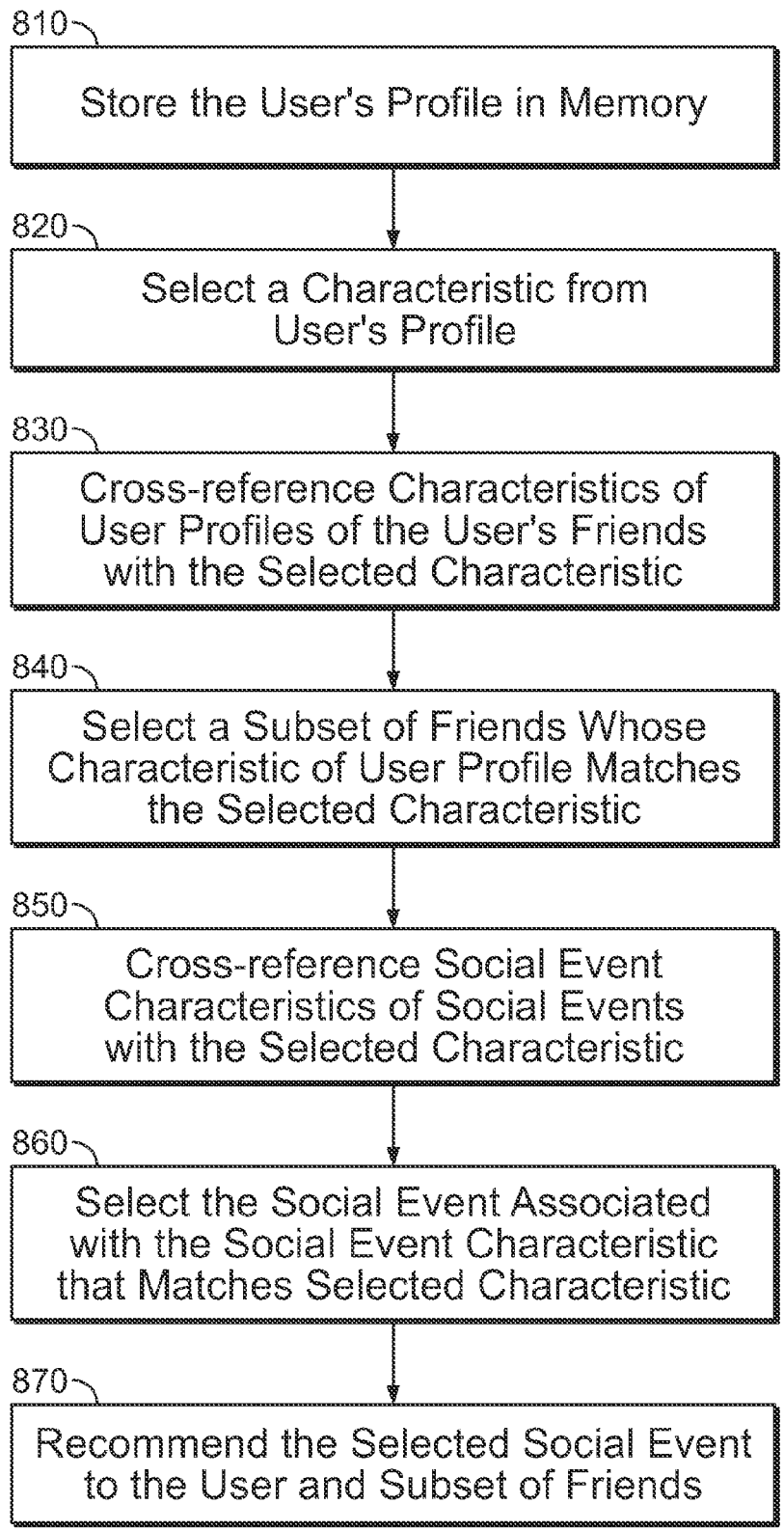
FIG. 8 shows an illustrative flow diagram for generating a social event recommendation, in accordance with an embodiment of the invention.

FIG. 8 shows an illustrative flow diagram for generating a social event recommendation, in accordance with an embodiment of the invention. At step 810, the user's profile may be stored in memory. For example, the user's profile may be stored in user profile database 630 of FIG. 6 as part of a social network. User profiles of the user's friends and other members of the social network may also be stored in user profile database 630. User profiles may be stored at any appropriate time, for example, when a user joins the social network. User profiles may be updated automatically or manually and any point thereafter.

At step 820, an interest may be selected from the user's profile. For example, social event recommendation engine 620 of FIG. 6 may select an interest from the user's profile stored in user profile database 630. Social event recommendation engine 620 may select an interest from the user's profile at random or proceed down the list of the user's interests in sequence. If the interests field of user profile data 710 of FIG. 7 is empty, social event recommendation engine 620 may request the user to input an interest.

At step 830, the interest selected in step 820 may be cross-referenced with interests of the user's friends. For example, social event recommendation engine 620 may use any suitable matching algorithm such as comparing word strings corresponding to interests of the user's friends to word strings corresponding to the selected interest. Pattern matching algorithms that identify similarities in word strings or phrases may also be employed. Social event recommendation engine 620 may map both the interests of the user's friends and the selected interest to points in a multidimensional space and then determine the magnitude of the vector distance between the respective points. A small magnitude of the vector distance may indicate a high similarity between the interests of the user's friends and the selected interest. Cross-referencing the interest selected in step 820 with interests of the user's friends is described further in connection with FIG. 10 below.

At step 840, a subset of the user's friends whose interests are similar to the selected interest of the user may be selected. For example, social event recommendation engine 620 may select each of the user's friends who have at least one similar interest to the selected interest based on the cross-referencing performed at step 830.

At step 850, the interest selected in step 820 may be cross-referenced with characteristics of social events. For example, social event recommendation engine 620 may cross-reference the characteristics of social events stored in social event database 640 of FIG. 6. The cross-referencing may be performed in a manner substantially similar to the manner described in connection with FIG. 6 above.

At step 860, a social event with at least one characteristic that is similar to the selected interest may be selected. For example, social event recommendation engine 620 may select each of the social events that have at least one characteristic similar to the selected interest based on the cross-referencing performed at step 850.

In some implementations, the interests of the user's friends may be cross-referenced with the characteristics of the selected social event. For example, if the interest of the user that is selected in step 820 is a first sporting event team (e.g., a football team, say the New York Giants), the social event selected by social event recommendation engine 620 may be a football game between the New York Giants and a second sporting event team (e.g., a football team, say the Miami Dolphins). Accordingly, social event recommendation engine 620 may determine whether any of the user's friends are interested in football, the first sporting event team, or the second sporting event team.

In some implementations, if the geographic location of the social event selected at step 860 is more than some pre-determined or user specified distance away from the user's geographic location, then that selected social event may be eliminated. For example, if the social event selected by social event recommendation engine 620 is a football game between the New York Giants and the Miami Dolphins which is taking place 100 miles away from the user's geographic location, then this football game may be eliminated by social event recommendation engine 620 and not recommended to the user.

At step 870, the social event selected at step 860 may be recommended to the user and the subset of the user's friends selected at step 840. For example, social event recommendation engine 620 may present the one or more selected social events to the user on display screen 510 of FIG. 5B. Social event recommendation engine 620 may additionally present the user with a list of friends who may also be interested in attending the selected social event. The user may customize the suggested list of friends. Social event recommendation engine 620 may send an event invitation to the friends selected by the user using notification engine 650.

Figure 9:
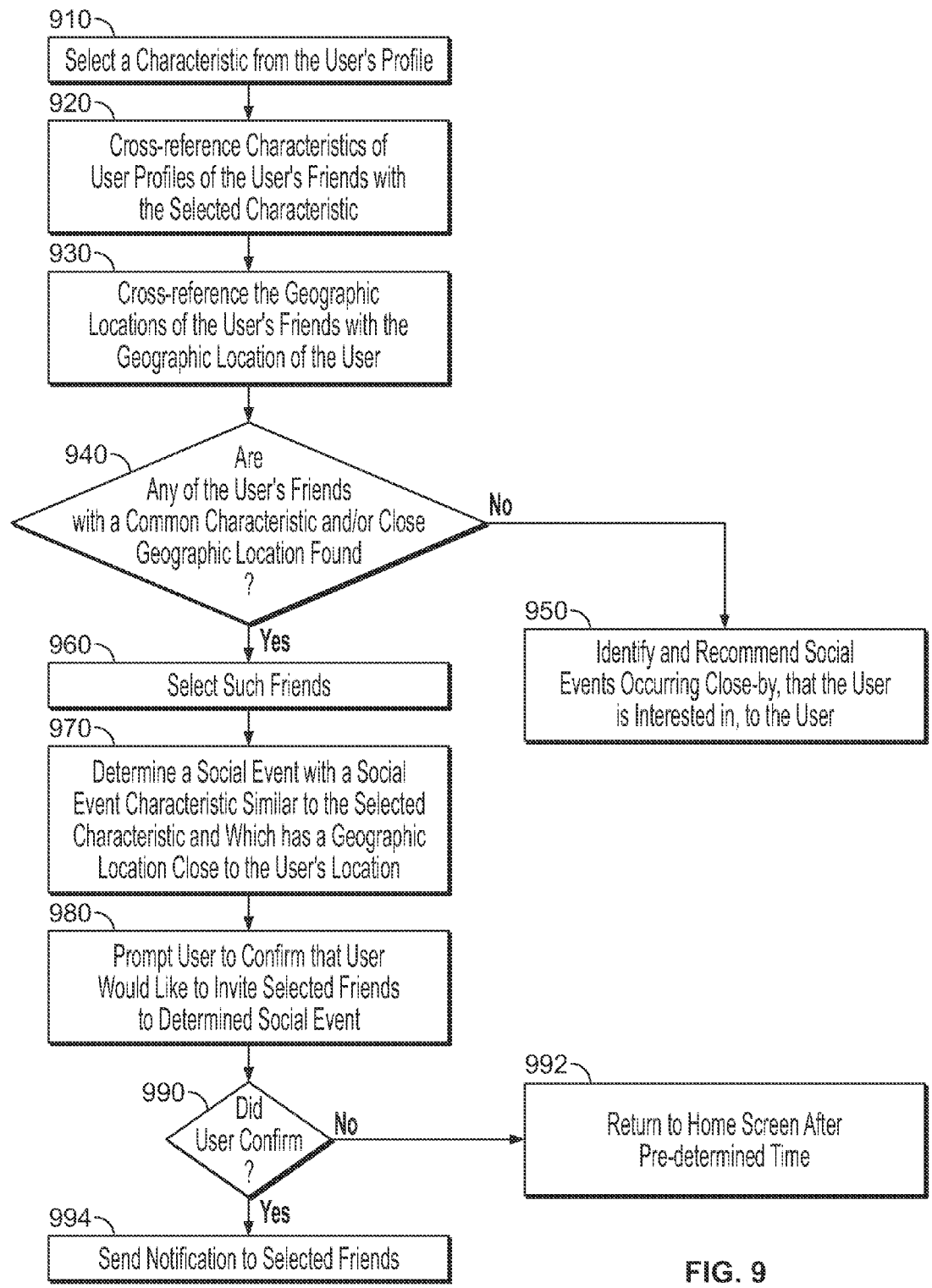
FIG. 9 shows another illustrative flow diagram for generating a social event recommendation, in accordance with an embodiment of the invention.

FIG. 9 shows another illustrative flow diagram for generating a social event recommendation, in accordance with an embodiment of the invention. At step 910, an interest may be selected from the user's profile. For example, social event recommendation engine 620 of FIG. 6 may select an interest from the user's profile stored in user profile database 630. Social event recommendation engine 620 may select an interest from the user's profile at random or proceed down the list of the user's interests in sequence. If the interests field of user profile data 710 of FIG. 7 is empty, social event recommendation engine 620 may request the user to input an interest.

At step 920, the interest selected in step 910 may be cross-referenced with interests of the user's friends. Cross-referencing may be performed in a manner substantially similar to the manner described in connection with step 830 of FIG. 8 above.

At step 930, the geographic location of the user may be cross-referenced with the geographic locations of the user's friends. For example, social event recommendation engine 620 may read the geographic location field from user profile data 710 of FIG. 7 for the user and each of the user's friends. Social event recommendation engine 620 may perform distance calculations on the read geographic locations. Distances may be calculated using any suitable algorithm, such as Euclidean distance. For example, social event recommendation engine 620 may determine which of the user's friends are at a geographic location that is less than a threshold distance from the user's geographic location.

At step 940, a determination may be made as to whether any of the user's friends have at least one interest similar to any of the user's interests and/or whether any of the user's friends are at a geographic location that is close to the user's geographic location. In response to a determination that none of the user's friends has similar interests and that none of the user's friends is geographically located close by, the process may move to step 950 where social event recommendation engine 620 may identify and recommend to the user social events that are occurring close to the user's geographic location and that match the user's interests. In response to a determination that one or more of the user's friends have at least one similar interest as the user or that one or more of the user's friends are geographically located close by, the process may move to step 960.

At step 960, the user's friends identified at step 940 may be selected. For example, social event recommendation engine 620 may store identifiers corresponding to the identified friends of the user.

At step 970, a social event that has at least one characteristic similar to any of the user's interests and/or a social event taking place at a geographic location that is close to the user's geographic location may be determined. The determination may be made in a manner substantially similar to the manner described in connection with FIG. 6 above. If no matching social event is found, the user may be informed accordingly.

In some implementations, the geographic location of the social event determined at step 970 may be cross-referenced with the geographic locations of the user's friends. For example, social event recommendation engine 620 may perform distance calculations on the read geographic locations. For example, social event recommendation engine 620 may determine which of the user's friends are at a geographic location that is less than a threshold distance from the geographic location of the social event. The user's friends who satisfy this criterion may added to the set of friends selected at step 960.

At step 980, the user may be prompted to confirm that the user would like to invite the friends identified at step 940 to the social event determined at step 970. The user may additionally customize the selected list of friends by adding or removing friends from the list.

At step 990, a determination may be made as to whether the user has completed customizing the list of selected friends. In response to a determination that the user has not entered any input for a predetermined period of time the process may proceed to step 992 where social event recommendation engine 620 may prompt the user to confirm selection again or take the user back to a home display screen. In response to a determination that the user has confirmed the selection of friends, the process may proceed to step 994.

At step 994, the friends confirmed by the user at step 980 may be sent event invitations. For example, social event recommendation engine 620 may send event invitations to the selected friends using notification engine 650 of FIG. 6 as described above in connection with FIG. 6.

Certain steps described above in connection with FIG. 9 may be omitted or modified in a second embodiment as described below. At step 910, an interest may be selected from the user's profile as described in FIG. 9 above in connection with the first embodiment.

The process may then proceed to step 970, where a social event that has at least one characteristic similar to any of the user's interests and/or a social event taking place at a geographic location that is close to the user's geographic location may be determined. The determination may be made in a manner substantially similar to the manner described in connection with FIG. 6 above.

For example, if the user is interested in a first sporting event team (e.g., a football team, say the New York Giants), an upcoming football game between the first sporting event team and a second sporting event team (e.g., a football team, say the Miami Dolphins), may be of interest to the user.

The process may then proceed to step 920 where characteristics of the social event determined at step 970 may be cross-referenced with interests of the user's friends. Cross-referencing may be performed in a manner substantially similar to the manner described in connection with step 830 of FIG. 8 above with the difference that characteristics of the determined social event, rather than the interest selected in step 910, are matched to interests of the user's friends.

The process may then proceed to step 940 where a determination may be made as to whether any of the user's friends have at least one interest similar to any of the characteristics of the determined social event. In response to a determination that none of the user's friends has similar interests, the process may proceed to step 980 where the user may be presented with an option to invite friends the user thinks might be interested in the determined social event.

In response to a determination that one or more of the user's friends have at least one interest similar to characteristics of the determined social event, the process may move to step 960. For example, if a sporting event between a first team and a second team the social event determined at step 970, a determination may be made at step 940 as to whether any of the user's friends are interested in the sporting event, the first sporting event team, or the second sporting event team. In particular, even though the user may not be interested in the second sporting event team, say the Miami Dolphins, since the Miami Dolphins are involved in the determined social event, friends who are interested in Miami Dolphins may accordingly be interested in also attending the determined social event. This approach of the second embodiment may therefore capture a different set of friends interested in the determined social event than in the first embodiment described above in connection with FIG. 9.

At step 980, the user may be prompted to confirm that the user would like to invite the friends identified at step 940 to the social event determined at step 970. The user may additionally customize the selected list of friends by adding or removing friends from the list.

At step 990, a determination may be made as to whether the user has completed customizing the list of selected friends. In response to a determination that the user has not entered any input for a predetermined period of time the process may proceed to step 992 where social event recommendation engine 620 may prompt the user to confirm selection again or take the user back to a home display screen. In response to a determination that the user has confirmed the selection of friends, the process may proceed to step 994.

At step 994, the friends confirmed by the user at step 980 may be sent event invitations. For example, social event recommendation engine 620 may send event invitations to the selected friends using notification engine 650 of FIG. 6 as described above in connection with FIG. 6.

Figure 10:
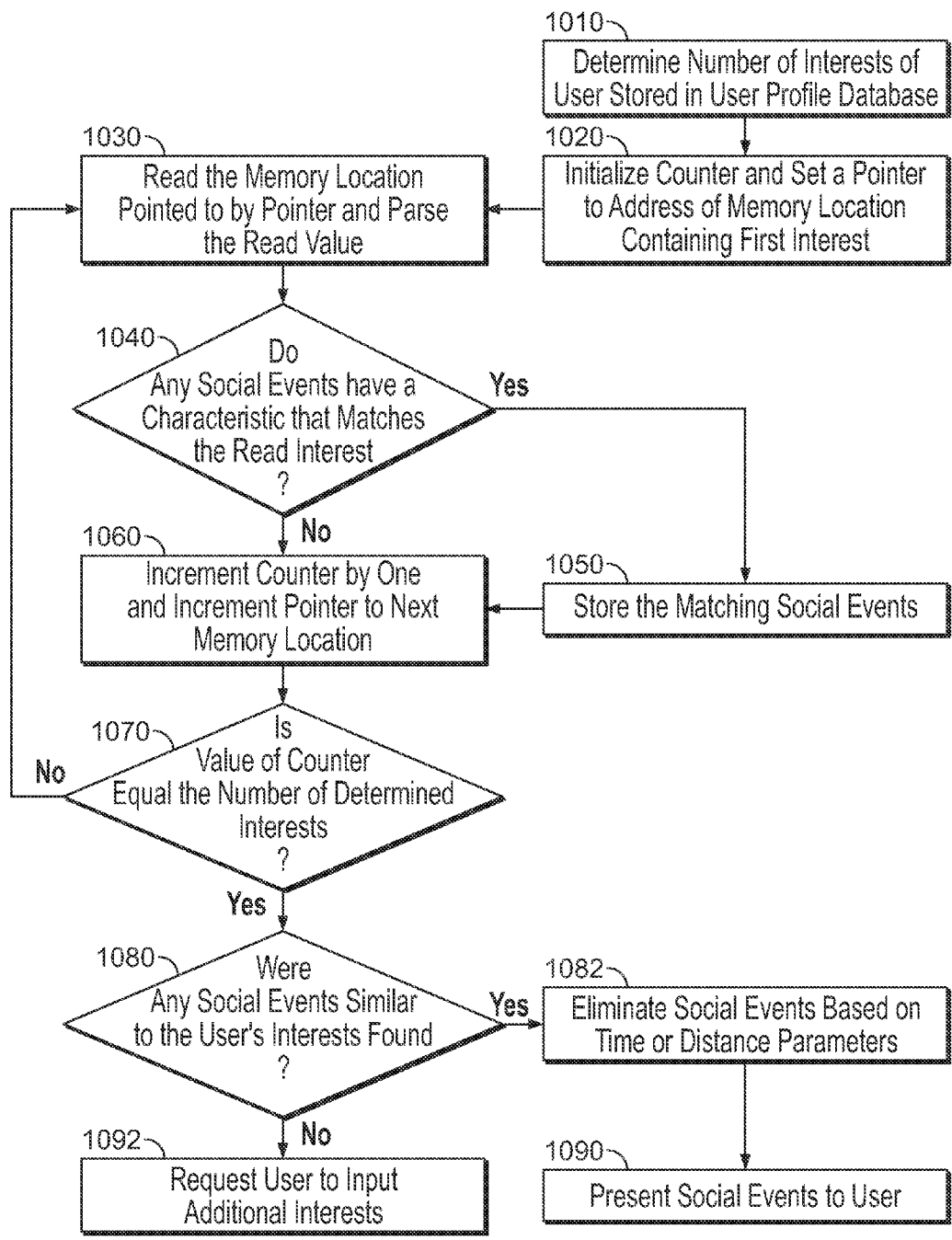
FIG. 10 shows an illustrative flow diagram for determining social event with characteristics similar to the user's interests, in accordance with an embodiment of the invention.

FIG. 10 shows an illustrative flow diagram for determining social event with characteristics similar to the user's interests, in accordance with an embodiment of the invention. At step 1010, the number of interests of the user stored in the user profile may be determined. For example, social event recommendation engine 620 of FIG. 6 may access user profile database 630 of FIG. 6 and count the number of different interests stored in the interests field of user profile data 710 of FIG. 10.

At step 1020, a counter and a pointer may be initialized. The value of the counter may be set to zero and the pointer may be set up to point to a memory location in user profile database 630 that contains a value of the first interest of the user. The counter and the pointer may be stored in storage 308 by social event recommendation engine 620.

At step 1030, the memory location pointed to by the pointer may be read and the read value may be parsed. For example, social event recommendation engine 620 may read the value of the memory location in user profile database 630 pointed to by the pointer. Social event recommendation engine 620 may parse the read value. For example, the read value may be converted to a format suitable for processing.

At step 1040, a determination may be made as to whether any social events have characteristics similar to the interest read at step 1030. For example, social event recommendation engine 620 may search social event database 640 to determine whether any social events have one or more characteristics that are similar to the interest of the user read at step 1030. The querying or searching of social event database 640 may be performed in a manner substantially similar to the manner described in connection with FIG. 6 above. In response to a determination that no social event has characteristics similar to the interest read at step 1030, the process may proceed to step 1060. In response to a determination that one or more social events have characteristics similar to the interest read at step 1030, the process may proceed to step 1050 where the determined social events may be stored in memory. For example, social event recommendation engine 620 may store social events with characteristics that are similar to the interest read at step 1030 in storage 308. The process may then proceed to step 1060.

At step 1060, the value of the counter may be incremented by one and the pointer may be incremented to point to the next memory location.

At step 1070, a determination may be made as to whether the value of the counter equals the number of the user's interests determined at step 1010. For example, social event recommendation engine 620 may compare the value of the incremented counter to the value of the number of the user's interests determined at step 1010. In response to a determination that the value of the counter is less than the number of the user's interests determined at step 1010, the process may proceed back to step 1030. In response to a determination that the value of the counter equals or exceeds the number of the user's interests determined at step 1010, the process may proceed to step 1080.

At step 1080, a determination may be made as to whether any social events were found that have at least one characteristic that is similar to any of the user's interests. For example, social event recommendation engine 620 may check whether any social events were stored in storage 308. In response to a determination that at least one social event was found, the process may proceed to step 1082. In response to a determination that no social event was found, the process may proceed to step 1092, where the user may be prompted that no matching social events were found. The user may be prompted to enter additional interests.

At step 1082, some of the social events that were found at step 1080 may be eliminated based on constraints such timing and distance preferences of the user. For example, if a social event found at step 1080 is geographically located at a distance that is greater than a pre-determined or user-specified threshold from the user's geographic location then that social event may be eliminated and not recommended to the user. For example, if a social event found at step 1080 occurs during a time interval that is not within a pre-determined or user-specified time interval then that social event may be eliminated and not recommended to the user.

At step 1090 the social events that have not been eliminated may be presented to the user on display screen 510 of FIG. 5.

It should be understood that the above steps of the flow diagrams of FIGS. 8-10 may be executed or performed in any order or sequence not limited to the order and sequence shown and described in the figures. Also, some of the above steps of the flow diagrams of FIGS. 8-10 may be executed or performed substantially simultaneously where appropriate or in parallel to reduce latency and processing times.

In some embodiments, after friends of the user have been selected as being interested in a recommended social event or have been invited to a recommended social event, the friends may be grouped according to their geographic location in order to provide transportation service recommendations. For example, a determination may be made of the geographic location of each of the friends invited to the social event. Friends that are located geographically close to each other, say within a predetermined threshold (e.g., say two miles) of each other, may be assigned to a group. Any other suitable distance value may also be used to classify friends into such geography-based groups.

All friends in a group may receive notifications encouraging them to travel together because of their geographic proximity to each other. Customized transportation service recommendations may be provided to each group. For example, a first group of friends may be geographically located close to a mass-transit station, such as a subway stop. Accordingly, members of the group may receive directions on how to travel to the geographic location of the social event using public transportation. They may also receive notification recommending a time and a place to meet up to start their travel. A second group of friends may be geographically located away from mass-transit hubs. Accordingly, members of the group may receive carpool and/or driving directions to the geographic location of the social event. In particular, one member of the group may receive a recommendation to drive all other members of the group to the social event.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The above-described embodiments of the present disclosure are presented for purposes of illustration and not of limitation, and the present disclosure is limited only by the claims which follow.

What is claimed is:

1. A method for recommending a social event to a user, the method comprising:
    storing in a memory:
        a user profile including characteristics of the user's interests,
        a plurality of user profiles, each user profile of the plurality of user profiles including characteristics of interests of a respective friend of the user; and
        a plurality of social events;
    periodically receiving, from a social event database, updated social events;
    storing the updated social events in the memory;
    receiving, over a communications network, from a media guidance application executed by a processor, a user request for a social event recommendation and a first threshold distance, wherein the media guidance application provides an interface enabling the user to request the social event recommendation and select the first threshold distance;
    selecting, in response to receiving the user request, a characteristic of the user's interests from the user profile stored in the memory;
    comparing a social event characteristic associated with the social event of the plurality of social events with the selected characteristic of the user's interests;
    when the social event characteristic of the social event matches the selected characteristic of the user's interests, determining a length of time between a current time and a start time associated with the social event;
    when the determined length of time is within a time period, determining a static geographic location based on a predetermined address associated with the user;
    when the determined length of time is outside the time period, determining a dynamic geographic location by determining a current location of the user based on GPS technology;
    determining a distance between a location of the social event and the determined geographic location;
    selecting the social event when the determined distance is less than the first threshold distance;
    selecting, using the processor, a subset of friends of the user, wherein each of the friends in the subset of the friends has a user profile characteristic matching the social event characteristic, and wherein the user profile characteristic of each of the friends in the subset of friends is determined by accessing the plurality of user profiles stored in the memory; and
    generating for display, in a display screen of the media guidance application, an identifier of the selected social event to the user in a map region and a plurality of identifiers of the selected subset of the friends.

2. The method of claim 1 further comprising selecting the subset of the friends based on a geographic location of each of the subset of friends and the determined geographic location.

3. The method of claim 2, wherein the geographic location of each of the friends in the subset of the friends is less than a second threshold distance from the determined geographic location.

4. The method of claim 2, wherein the geographic location of each of the friends in the subset of the friends is less than the first threshold distance from the location of the social event.

5. The method of claim 1 further comprising:
    determining a transportation service for the user and the subset of the friends to reach the location of the social event; and
    generating for display an identifier of the determined transportation service to the user and the subset of the friends.

6. The method of claim 5 further comprising determining the transportation service based on cost of the transportation service.

7. The method of claim 1, further comprising generating for display a second identifier of the selected social event, wherein generating for display the second identifier comprises sending at least one of an email, text message, phone call, social networking website notification, online notification, or smartphone notification.

8. The method of claim 1, wherein the plurality of social events is automatically compiled from online data sources.

9. The method of claim 1, further comprising receiving further updated social events in response to a change in the determined geographic location.

10. A system for recommending a social event to a user, the system comprising:
   a memory for storing:
      a user profile including characteristics of the user's interests,
      a plurality of user profiles, each user profile of the plurality of user profiles including characteristics of interests of a respective friend of the user; and
      a plurality of social events; and
   a processor configured to:
      periodically receive, from a social event database, updated social events;
      store the updated social events in the memory;
      receive, over a communications network, from a media guidance application executed by the processor, a user request for a social event recommendation and a first threshold distance, wherein the media guidance application provides an interface enabling the user to request the social event recommendation and select the first threshold distance;
      select, in response to receiving the user request, a characteristic of the user's interests from the user profile stored in the memory;
      compare a social event characteristic associated with the social event of the plurality of social events with the selected characteristic of the user's interests;
      when the social event characteristic of the social event matches the selected characteristic of the user's interests, determine a length of time between a current time and a start time associated with the social event;
      when the determined length of time is within a time period, determine a static geographic location based on a predetermined address associated with the user;
      when the determined length of time is outside the time period, determine a dynamic geographic location by determining a current location of the user based on GPS technology;
      determine a distance between a location of the social event and the determined geographic location;
      select the social event when the determined distance is less than a first threshold distance;
      select a subset of the friends of the user, wherein each of the friends in the subset of the friends has a user profile characteristic matching the social event characteristic, and wherein the user profile characteristic of each of the friends in the subset of friends is determined by accessing the plurality of user profiles stored in the memory; and
      generate for display, in a display screen of the media guidance application, an identifier of the selected social event to the user in a map region and a plurality of identifiers of the selected subset of the friends.

11. The system of claim 10, wherein the processor is further configured to select the subset of the friends based on a geographic location of each of the subset of friends and the determined geographic location.

12. The system of claim 11, wherein the geographic location of each of the friends in the subset of the friends is less than a second threshold distance from the determined geographic location.

13. The system of claim 11, wherein the geographic location of each of the friends in the subset of the friends is less than the first threshold distance from the location of the social event.

14. The system of claim 10, wherein the processor is further configured to:
   determine a transportation service for the user and the subset of the friends to reach the location of the social event; and
   generate for display an identifier of the determined transportation service to the user and the subset of the friends.

15. The system of claim 14, wherein the processor is further configured to determine the transportation service based on cost of the transportation service.

16. The system of claim 10, wherein the processor is further configured to generate for display a second identifier of the selected social event, and wherein the processor is configured to generate for display the second identifier by sending at least one of an email, text message, phone call, social networking website notification, online notification, or smartphone notification.

17. The system of claim 10, wherein the plurality of social events is automatically compiled from online data sources.

18. The system of claim 10, wherein the processor is further configured to receive further updated social events in response to a change in the determined geographic location.

* * * * *